United States Patent [19]

Krumwiede et al.

[11] Patent Number: 4,818,265

[45] Date of Patent: Apr. 4, 1989

[54] BARRIER APPARATUS AND METHOD OF USE FOR MELTING AND REFINING GLASS OR THE LIKE

[75] Inventors: John F. Krumwiede, Cumberland, Md.; Henry C. Goode, Decatur, Ill.

[73] Assignee: PPG Industries, Inc., Pittsburgh, Pa.

[21] Appl. No.: 133,587

[22] Filed: Dec. 14, 1987

[51] Int. Cl.⁴ .............................................. C03B 5/20
[52] U.S. Cl. ........................................ 65/135; 65/337; 65/342; 65/345; 65/347; 65/374.12; 65/374.15
[58] Field of Search ................. 65/135, 374.12, 335, 65/347, 374.15, 345, 342, 337, 338

[56] References Cited

U.S. PATENT DOCUMENTS

| | | | |
|---|---|---|---|
| 4,045,203 | 8/1977 | Bhardwaj et al. | 65/374.15 |
| 4,317,669 | 3/1982 | Boss et al. | 65/342 X |
| 4,349,376 | 9/1982 | Dunn et al. | 65/337 X |
| 4,381,934 | 5/1983 | Kunkle et al. | 65/135 |

FOREIGN PATENT DOCUMENTS 283693 10/1952 Switzerland ..................... 65/345

Primary Examiner—Arthur Kellogg
Attorney, Agent, or Firm—Dennis G. Millman

[57] ABSTRACT

In a method of making glass or the like, wherein the batch materials are liquefied in a distinct zone from the refiner, the liquefied material is heated in an intermediate stage before being fed to the refiner, and a composite barrier of a cooled frame with graphite inserts is employed to restrict passage of material from the intermediate stage.

12 Claims, 2 Drawing Sheets

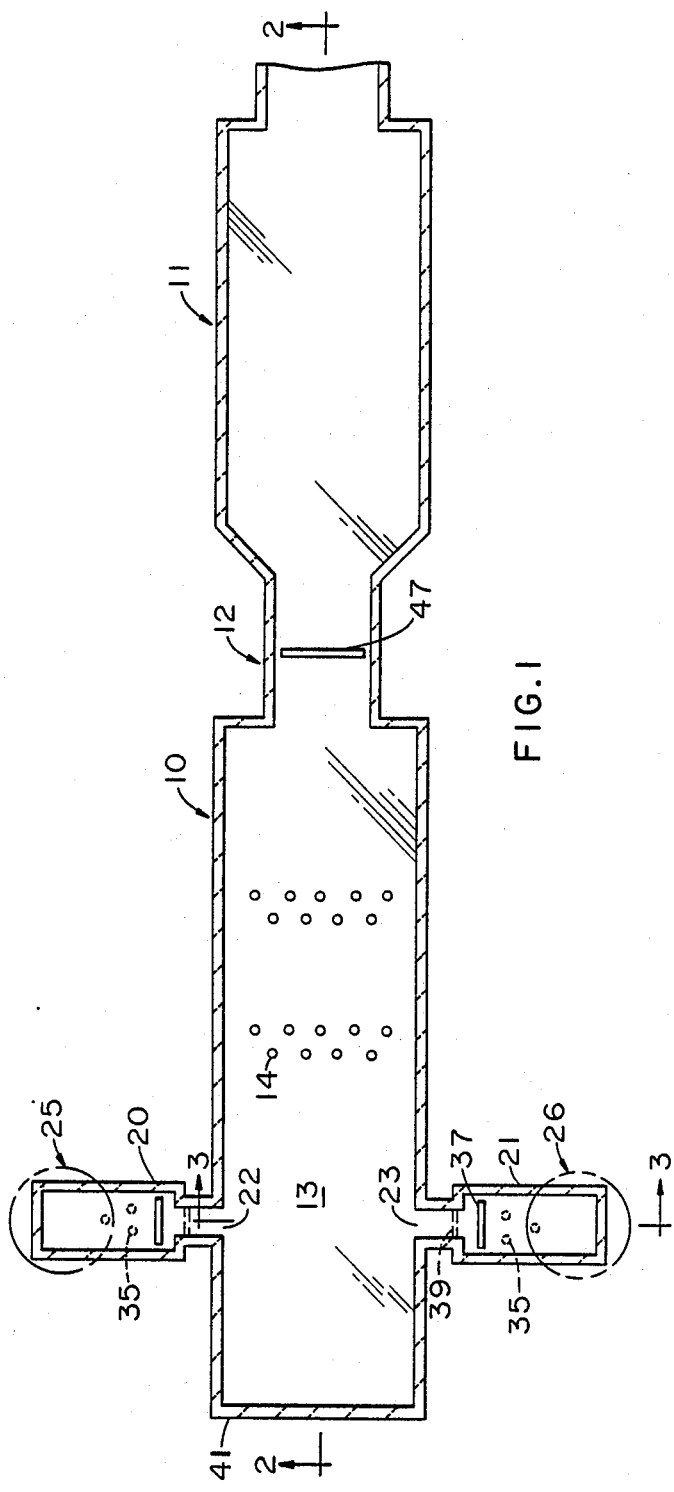
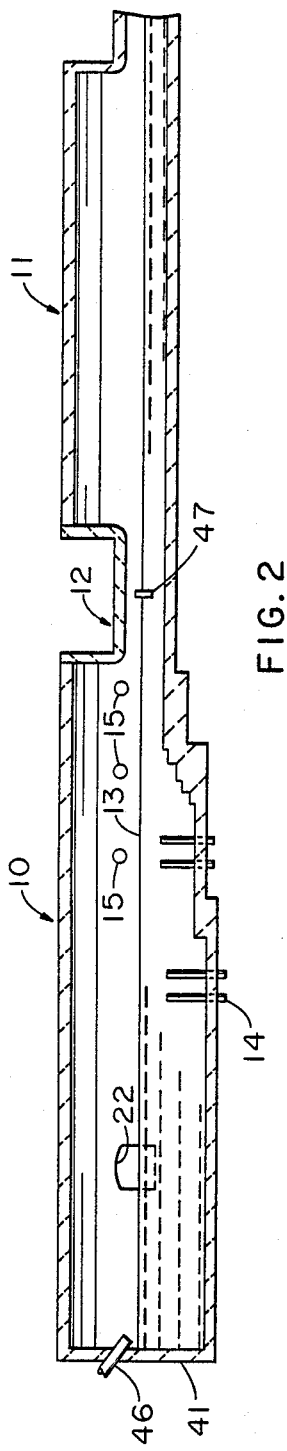

BARRIER APPARATUS AND METHOD OF USE FOR MELTING AND REFINING GLASS OR THE LIKE

BACKGROUND OF THE INVENTION

The present invention relates to a staged process and apparatus for producing glass or the like of the type disclosed in U.S. Patent application Ser. No. 91,178 filed on Aug. 31, 1987. Although specifically applicable to production of vitreous glass products such as flat glass, fiber glass, container glass, or sodium silicate glass, the invention is also applicable to similar products that may not be considered "glass" under strict definitions. It should be understood that the term "glass" is used herein in the broader sense to include glass-like products. On the other hand, because of the higher standards for optical quality of flat glass, the improvements in refining achieved by the present invention are particularly significant to the production of flat glass.

In U.S. Pat. No. 4,381,934 to Kunkle et al. there is disclosed a process for performing the initial step of the melting process, rendering pulverulent batch materials to a liquefied, partially melted state. This process requires that the melting process be completed by a subsequent process stage for most glass products. Refining of the liquefied material would be a typical task of the subsequent process stage. In the Kunkle et al. patent, it is disclosed that the refining may be carried out by feeding the liquefied material to a conventional tank-type melting furnace. In order to optimize the economies of construction and operation of such a staged melting and refining operation, it is desirable to carry out the refining in as efficient a manner as possible, thereby minimizing the size of the refining apparatus and the energy consumed therein.

In the melting of glass, substantial quantities of gas are produced as a result of decomposition of batch materials. Other gases are physically entrained by the batch from combustion heat sources. Most of the gas escapes during the initial phase of melting, but some becomes entrapped in the melt. A primary objective of refining is to provide sufficient time and temperature conditions for substantial portions of these entrapped gases to be eliminated from the melt. Because elevated temperatures expedite the rise and escape of gaseous inclusions, the highest temperatures of the melting process are typically provided in the refining zone. Additionally, thermal conditions are conventionally controlled in the refining zone to maintain recirculating flows of the molten glass in order to provide adequate residence time and to assure that the throughput stream passes through the region at high temperatures, where gases are released into the space above the melt, and that unrefined portions of the melt are directed away from the throughput stream. Additionally, the refining stage may be employed to assure dissolution of any remaining solid particles of the batch. Furthermore, the recirculation established during refining can be useful in homogenizing the melt. It would be desirable to optimize the achievement of at least some, and preferably all, of these objectives of refining when coupled to a discrete liquefying stage as in U.S. Pat. No. 4,381,934.

A difficulty arises from the fact that material discharged from a liquefying stage is only partially melted, typically being in a substantially foamy condition with unmelted solid particles. When such material is passed to a pool of molten glass in a refining furnace, the material tends to stratify near the surface of the pool. This stratified material has been found to not respond to the recirculating flows within the main portion of the pool that assure adequate residence time and temperature exposure to accomplish the refining step. Accordingly, discharging material from a liquefying stage directly to a recirculating refining furnace as shown in U.S. Pat. No. 4,381,934 has been found to yield inadequate refining.

Another problem is that maintaining the desired convection flow patterns in the refiner is more difficult when the material entering the refiner is liquefied. This is because in a conventional tank type melting and refining furnace the unmelted batch materials fed onto the molten pool serve as a heat sink at one end of the pool, thereby creating a downward flow in that region which contributes to sustaining a strong circulation pattern. Such an effect is not present to as great an extent when the batch materials are liquefied at a separate location. When there is insufficient recirculation in the refiner, the probability increases that a portion of the material will pass quickly to the outgoing product stream, thereby contaminating the product with inadequately refined glass.

In the aforesaid U.S. patent application, an arrangement is proposed whereby glass batch material or the like is liquefied and refined in discrete, physically separated stages, but instead of passing the liquefied material directly to the refining stage, it passes through an intermediate stage where it is readied for entry into the refiner. By providing an intermediate receiving vessel, the stratified foam layer can be contained separately from the refiner, the temperature of the material can be increased so as to be more compatible with the desired convection flow patterns in the refiner, and undissolved sand grains and the like may be provided with sufficient residence time to substantially completely dissolve before entering the refiner.

A preferred embodiment for effecting the intermediate processing of liquefied material being fed to the refiner is an elongated, narrow channel. Typically, the channel has length and width considerably less than that of the refiner. Advantageously, a plurality of liquefying stages may feed a single refiner, in which case each is preferably provided with a channel connecting it with the refiner. Since the primary function of the channel is to permit the liquefied material to be heated to a higher temperature, substantial volume in the channel is not necessary.

The use of a relatively compact channel as the intermediate stage has advantages but also is accompanied by problems. One problem is that the foamy, low density, partially melted material can be difficult to retain in the small vessel. Event when a surface barrier is employed, the short distances involved in the vessel sometimes permit the low density material to be drawn into the stream flowing to the refiner. Extending a barrier farther below the surface of the melt may provide better blockage of surface entrainment but leads to undesirably effects in a system of the type to which the present invention relates. A barrier submerged deeply into the melt leaves less of an opening below for passage of material, thereby resulting in higher velocities of flow through the opening, particularly when the vessel is a compact channel. High velocity flow under a barrier made of ceramic refractories can produce accelerated erosion of the barrier and undesirable contamination of the molten material. Employing a non-contaminating material such as platinum is prohibitively costly for such an application. Less costly metal such as stainless steel could serve as a barrier provided that it is cooled, but the amount of cooled surface area entailed by a cooled barrier for this situation can result in unduly great heat extraction from the melt. The cooling is not only at odds with the purpose of the channel to heat the molten material, but also tends to create undesirable flow patterns in the melt retained in the channel. A cooled barrier produces a downward current at the outlet end of the channel which can entrain low density surface material into the flow stream leaving the channel. Also, cooling increases temperature differences between regions within the melt, thereby serving as a greater driving force for circulation, which is undesirable in this environment where an objective is to prolong the residence time in the channel of each increment of melt.

SUMMARY OF THE INVENTION

The present invention relates to improvements in the mass flow control in an intermediate stage between liquefying and refining of glass or the like. The invention involves the use of a composite barrier at the outlet end of the intermediate vessel to block passage of low density surface material into the refiner, the barrier being an assembly of uncooled graphite elements supported in a cooled metallic frame. Because substantial portion of the surface area of the barrier are uncooled, the barrier can be deeply submerged into the melt without extracting undue amounts of heat from the melt and without exacerbating unwanted circulation patterns. Graphite has substantial durability in contact with molten glass without being cooled provided that it is not permitted to oxidize by coming into contact with air or other oxidizing agent. Event if the graphite is oxidized, its decomposition products are not contaminating to the glass. To preserve the graphite, only portions of the barrier that are submerged in the melt during normal operation are provided with graphite elements. To provide structural support for the barrier extending out of the melt, cooled elements such as stainless steel conduits may be used. Also, at the elevation of the surface of the melt, water cooled elements may be employed to avoid exposure of graphite to the atmosphere. Although some cooled elements are present, the present invention permits deployment of a deeply submerged barrier wherein a substantial proportion, preferably more than half, of the area in contact with the melt is uncooled.

With the composite barrier of the present invention the exit path from the intermediate vessel may be restricted to the lowermost elevations of the vessel by lowering the barrier close to the bottom, preferably no higher than the lower half of the depth of liquefied material at that location. This advantageously isolates the less dense upper strata of material from the exiting stream. The limited cooling of the barrier minimizes creation of descending currents of glass in the region of the barrier. At the same time, contamination of the melt is substantially avoided. The proportion of the submerged surface area of the barrier that is uncooled may vary considerably, but the advantages of the present invention become notably significant when the uncooled area exceeds about thirty percent. In preferred embodiments the uncooled area may be at least fifty percent.

THE DRAWINGS

FIG. 1 is a top view in cross-section of a preferred embodiment of the environment of the present invention showing a pair of channels feeding a refiner.

FIG. 2 is a cross-sectional side view of the embodiment of FIG. 1, taken along line 2—2 in FIG. 1.

DETAILED DESCRIPTION

Figure 3:
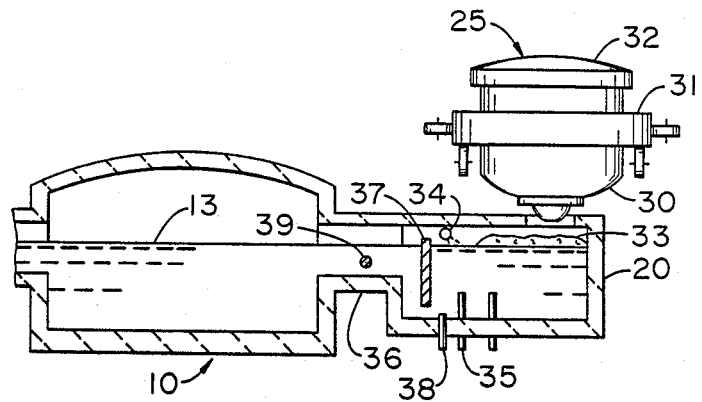
FIG. 3 is a transverse cross-sectional view of the same preferred embodiment, taken along line 3—3 in FIG. 1, showing a preferred type of liquefier associated with one of the channels.

Referring to FIGS. 1 and 2, there is shown a refiner 10 and a conditioner 11 jointed by a narrowed waist section 12, all of which are fabricated of conventional refractory ceramic materials normally used for glass melting furnace applications. The refiner 10, conditioner 11, and waist 12 are configured much like a conventional glass melting furnace but with substantially smaller dimensions and with less provision for heating. The refiner is preferably provided with some heating means to bring the molten material 13 to its peak temperature and to help establish the desired circulation patterns within the refiner. To this end, the embodiment depicted is provided with electrodes 14 for passing electric current through the melt so as to resistively heat the melt. A variety of electrode patterns could be employed, the preferred arrangement as illustrated having two groups of double, transverse rows. Combustion burners 15 may also be provided if additional heating capacity is required. Because a substantial portion of the overall energy requirement is provided in the liquifying stage, the heating requirements for the refiner of the present invention are substantially less than for a conventional tank type melting and refining furnace.

As shown in FIG. 1, a pair of channels 20 and 21 lead into the refiner 10 through openings 22 and 23, respectively, in side walls of the refiner. In the arrangement shown, a pair of channels is included, but it should be understood that a larger or smaller number of channels could be provided and that all of the channels need not be in use at any given time. Thus, the system is capable of major incremental changes in throughput. Each channel receives at least partially molten material from a respective liquefying vessel 25, 26. The liquefying stage could assume various configurations as are known in the art, but a particularly advantageous embodiment is that shown in the aforementioned U.S. Pat. No. 4,381,934, wherein a layer of batch material acts as insulation within a rotating vessel and additional batch fed onto the insulating layer is quickly liquefied by intense heat and immediately flows through a bottom opening.

A schematic representation of the preferred liquefying vessel is shown in FIG. 3. The vessel 25 includes a steel drum 30 supported on a circular ring 31, which in turn is mounted for rotation about a vertical axis. A stationary lid 32 may be fitted with a plurality of burners, preferably fired with oxygen, or other heat sources (not shown), and the lid may have an opening (not shown) through which batch materials may be fed into the vessel 25. Additional details of the liquefying process may be found in U.S. Pat. No. 4,381,934.

When glass batch material is liquefied by the preferred embodiment, the liquefied material entering the channel 20 is only partially melted, consisting of a substantial liquid phase including chiefly the soda source material such as soda ash, and a minor solid phase principally including sand grains. The partially melted material at this stage also includes a substantial gas phase consisting mostly of carbon dioxide from decomposition of carbonate mineral batch ingredients. As a result, a foamy layer 33 is usually present on the surface of the material in the channel. Also, as it exits the liquefying vessel, a typical soda-lime-silica glass melt is about 500 to 800 degrees Fahrenheit (270 to 450 degrees Celsius) below the desired peak temperature for refining.

Depending upon the type and quality of glass being produced, the liquefied material received in the channel has had imparted to it a major portion of the total energy requirement for melting and refining. Accordingly, only relatively minor additional amounts of energy need be imparted to the melt, and it has been found advantageous to supply a substantial portion of that energy in the channels before the melt enters the convection refiner. Some of the refining functions, e.g., completing dissolution of sand grains and expelling gases from the melt, may take place in the channels, but the primary function performed in the channels is to increase the temperature of the melt. The temperature is raised in general to about midway between the temperature at which the material enters the channels and the peak refining temperature. By way of example, a glass refined at 2800° F. (1540° C.) is advantageously heated in the channels to about 2300° F. (1260° C.) to 2500° F. (1370° C.). The determining factor in selecting the channel exit temperature is the resulting interaction of the material from the channels on the circulation pattern within the refiner 10. Heating within the channels may be provided by electrodes 35 as in the embodiment shown in the drawings.

Means for providing combustion heating to the channels may include an elongated, transversely extending burner 34 having a plurality of burner orifices as shown in FIG. 3. This arrangement not only serves to heat the liquefied material, but also, when the burner flames are angled in an upstream direction, serves to retain the foam layer 33 at the upstream end of the channel, thereby lessening the chances for portions of the foam to be passed into the refiner.

Residence time of the melt in the channels need be only sufficient to accomplish the heating function. Thus, each channel is considerably smaller in volume than the refiner, and the channels are preferably narrow in configuration to provide proximity of the melt to the heat sources and to minimize heat loses. Because of the relatively small size of the channel, the foam layer 33 is a short distance from the exit from the channel, and it has been found to be advantageous to provide means to block passage of the foam into the refiner. In accordance with the present invention the restraint for the foam is a barrier 37 deeply submerged in the material in the channel so that only the most dense material from the lowermost portions of the channel pass under the barrier and through the exit from the channel. The barrier 37 may consist of an assemblage of conduits through which coolant (e.g., water) is passed and may project above the level of the liquefied material so that no material passes over the barrier. The submerged portions of the barrier 37 include graphite sections so as to reduce the cooled surface area as will be described in greater detail below. A bubbler 38 may be utilized close to the upstream side of the barrier to counteract downward currents of glass caused by the cooling effect of the barrier 37. Such a downward current could detrimentally draw the less dense surface material into the stream flowing under the barrier 37. The bubbler may comprise a water-cooled tube through which a gas such as air or nitrogen is injected into the molten material. The injected gas bubbles rise, causing an upward entrainment of the molten material in the region above the bubbler. A raised sill portion 36 may be provided at the entrance of each channel onto the refiner in order to direct the material into the upper elevations of the molten material in the refiner. Optionally, the effective elevation of the sill 36 can be varied by means of an insert 39 that may rest on or near the sill. The insert may be a water-cooled pipe or preferably a graphite rod. A preferred channel exit temperature when processing soda-lime-silica glass may be about 200° F. to 500° F. (110° C. to 280° C.) below the peak refining temperature.

An optional feature shown in FIG. 2 is a feed tube 46 extending into the refiner 10 through the back wall 41. Cullet may be introduced into the refiner through the feed tube 46.

In the conditioner 11 (FIGS. 1 and 2) the molten material is permitted to cool to a temperature suitable for forming into the desired product such as glass sheets. For soda-lime-silica flat glass the forming temperature is typically in the range of 1900° F. to 2100° F. (1040° C. to 1150° C.).

A cooler 47 at the waist 12 between the refiner 10 and the conditioner 11 as shown in FIGS. 1 and 2 may be employed to regulate molten glass flow into the conditioner and the return flow from the conditioner to the refiner. The cooler 47 is immersed in the upper, forwardly flowing portion of the molten glass and serves to retard the forward velocity and to decrease the circulation of material into and out of the conditioner. This has the beneficial effect of increasing the residence time of the forwardly flowing stream between the spring zone and the conditioner, an interval during which the glass is generally at or near its peak temperature and is subjected to optimal refining conditions.

The size of a melting furnace is affected by its intended throughput capacity. the resident volume of molten material in a conventional flat glass melting and refining furnace (including the conditioner section) is typically on the order of two to three times the daily (24 hours) throughput volume of glass. It is an indication of its efficiency that with the arrangement of the present invention the resident volume of molten glass in the refiner 10 and conditioner 11 may be less than two times the daily throughput, preferably less than 1.5 times, and a particular embodiment has been designed with the resident volume approximately equal to the intended maximum daily throughput.

Figure 4:
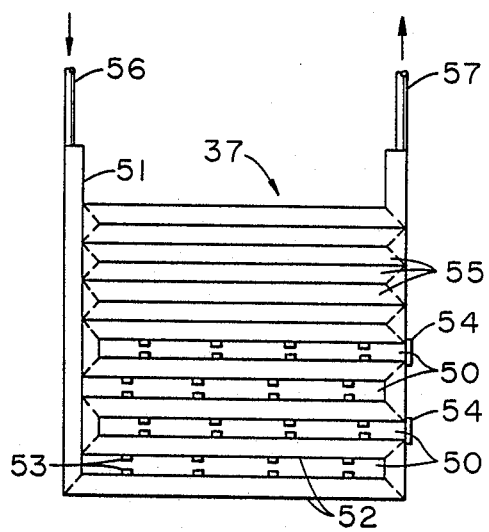
FIG. 4 is an enlarged elevational view of an embodiment of barrier in accordance with the present invention.
Figure 5:
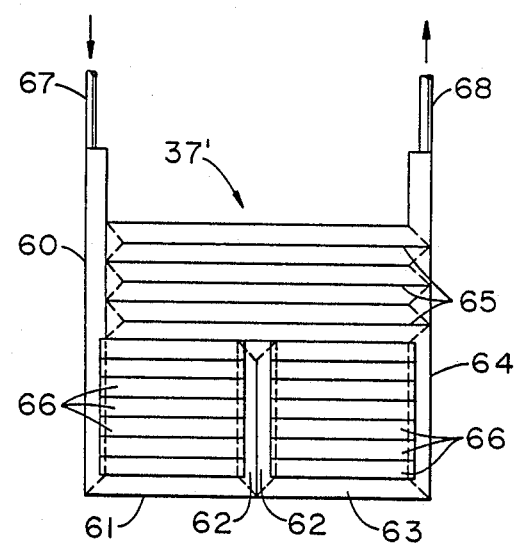
FIG. 5 is an enlarged elevational view of an alternative embodiment of a barrier in accordance with the present invention.

Examples of structures that may be employed for the composite barrier 37 are shown in FIGS. 4 and 5. In the FIG. 4 embodiment the structure comprises a cooled, metallic frame having a serpentine path with graphite slabs 50. In all of the embodiments the frame is preferably fabricated of stainless steel in order to prolong the life of the barrier and is provided with passages for circulation of coolant, preferably water. Thus, the frame is preferably comprised of stainless steel conduits.

In FIGS. 4 the frame includes a substantially downwardly extending conduit section 51 connected to a rising serpentine section of conduits with a chiefly horizontal dimension between each turn. The lower group of serpentine conduits 52 are spaced apart to provide an opening or openings in which the graphite slabs 50 may be received. The shape and dimensions of the graphite slabs 50 may vary, but square or rectangular cross-sectional shapes are typically available and are convenient. The larger the vertical surface area of the graphite slabs, the larger is the portion of the total surface area of the barrier that is uncooled. Therefore, it is desirable to maximize the size of graphite slabs 50. The slabs 50 need not be monolithic pieces. In particular, it is desirable to install two or more slabs in a vertical stack so as to increase the size of the graphite-filled area between the passes of the serpentine cooler. Thus, another embodiment might consist of a single large uncooled area made up of several pieces of graphite or of a single large slab of graphite.

In FIG. 4 the slabs 50 are held in place by metallic tabs 53 welded to the cooled frame members. Instead of separate tabs above and below each graphite-filled space, continuous straps spanning the space may be employed. A strap 54 may be welded onto the side of the barrier as shown in FIG. 4 to close any otherwise open-ended spaces in the serpentine pattern. It should be appreciated that the serpentine pattern could be oriented differently from that shown in FIG. 4 so that the major dimension of the graphite slabs extends vertically rather than horizontally. It should also be apparent that the invention is not limited to elongated shapes for the graphite inserts, but could include a variety of graphite shapes with the cooled frame members configured appropriately to accommodate the particular shapes.

The height of the section of the barrier in FIG. 4 that includes the graphite inserts 50 is limited to that portion which is expected to remain submerged in the melt during normal operating conditions. In the upper portion of the barrier, at elevations that may be exposed to the atmosphere during use, no graphite is present, and no spaces are provided between the serpentine coolant conduits 55 in that region. The height of the cooled section made up of the upper conduits 55 is sufficient to accommodate any vertical adjustments of the barrier or any level fluctuations of the molten material that may be contemplated. The number of passes in the upper serpentine conduits 55 could be reduced substantially from that shown in FIG. 4 is stable elevations of the barrier and the melt are expected. Water supply and drain conduits 56 and 57, respectively, extend through the roof or upper side wall portions of the channel 20 and serve as means to support the barrier 37 outside the channel with vertical adjustability if desired.

An alternative embodiment is shown in FIG. 5, wherein a barrier 37' features larger continuous areas of graphite and a different attachment arrangement. In this embodiment, the lower portion of the cooled frame is configured as a rectilinear "W" holding two major sections of graphite, with a serpentine cooled area above. The water cooled conduit frame comprises a downwardly extending leg 60, generally horizontal section 61, center partition formed by upward and downward sections 62, another generally horizontal section 63, and an upwardly extending leg 64 that connects to the serpentine conduits 65 in the upper region of the barrier. The frame defines two relatively large rectangular or square areas in the lower portion, each of which may be filled with an array of stacked graphite slabs 66. The center partition formed by conduits 61 and 62 permits the use of shorter graphite pieces for the sake of additional structural strength but could be omitted, whereby graphite would extend continuously across the width of the barrier.

The attachment of the graphite slabs 66 in the FIG. 5 embodiment does not employ tabs as in the FIG. 4 embodiment, but instead provides grooves at each end of each slab within which the adjacent frame conduit is received. Additional structural integrity may be provided by tongue-and-groove connections between adjacent graphite slabs. As in the other embodiment, the upper conduit portions 65 are not provided with spaces for insertion of graphite so that no graphite is at or above the melt line during operation. Coolant circulation connections and external support connections may be effected by way of conduits 67 and 68.

The term "graphite" as used herein is not intended to preclude the presence of carbon in other forms in the barrier insert members. It should also be understood that the term "frame" as used herein need not entail a four sided structure. The frame could consist of any structure capable of supporting the graphite by engaging edge portions, including the side edges, the bottom edge, or the top edge, or any combination thereof.

Other variations and modifications as would be obvious to those of skill in the art may be resorted to within the scope of the invention as defined by the claims that follow.

We claim:

1. A method of making glass or the like wherein partially melted, liquefied glass batch materials are received in an intermediate vessel with relatively low density material at the surface regions of the pool of material held in the vessel, and the liquefied material is passed from an outlet end of the intermediate vessel to a refining stage, characterized by blocking flow at the outlet end of the vessel so as to restrict the outlet flow of the liquefied material to the lower half of the vessel, with the blocking at the surface regions being by means of a metallic structure extending across substantially the entire width of the vessel and provided with circulation of coolant, the blocking below the surface region being substantially by means of a graphite structure through which coolant is not circulated, whereby the blocking of unwanted surface flow is effected without undue cooling of the liquefied material adjacent to the barrier that would induce drawing low density material down into the outlet flow stream.

2. The method of claim 1 wherein the blocking below the surface region is effected by means of a plurality of graphite members.

3. The method of claim 2 wherein the graphite members comprise more than thirty percent of the surface area of the barrier submerged in the liquefied material.

4. The method of claim 2 wherein the graphite members comprise more than fifty percent of the surface area of the barrier submerged in the liquefied material.

5. The method of claim 2 wherein the graphite members are held in place by metallic frame members.

6. The method of claim 5 wherein the frame members comprise metallic conduits, further including passing water through the conduits.

7. Apparatus for making glass or the like comprising means for liquefying glass batch materials, an elongated channel for receiving partially melted material from the liquefying means, a refining vessel communicating with an outlet end of the channel, barrier means at the outlet end of the channel for restricting outlet flow to the lower half of the channel, the upper portion of the barrier means including a metallic structure extending across substantially the entire width of the channel so as to block flow at the surface of the material held in the channel, the metallic member being provided with means to pass coolant therethrough, a substantial area of the submerged portion of the barrier means consisting of a graphite structure not provided with coolant passage means, whereby significant reduction of the outlet opening can be achieved without unduly affecting the thermal conditions in the channel.

8. The apparatus of claim 7 wherein the graphite structure is comprised of a plurality of graphite members.

9. The apparatus of claim 8 wherein the graphite structure is mounted in a metallic frame.

10. The apparatus of claim 9 wherein the frame comprises metal conduits.

11. The apparatus of claim 8 wherein the graphite members comprise at least 30% of the submerged surface area of the barrier.

12. The apparatus of claim 8 wherein the graphite members comprise at least 50% of the submerged surface area of the barrier.

* * * * *